US009607166B2

(12) United States Patent
Martin et al.

(10) Patent No.: US 9,607,166 B2
(45) Date of Patent: Mar. 28, 2017

(54) DISCRETIONARY POLICY MANAGEMENT IN CLOUD-BASED ENVIRONMENT

(71) Applicant: MICROSOFT TECHNOLOGY LICENSING, LLC, Redmond, WA (US)

(72) Inventors: Pierre Martin, Seattle, WA (US); Vijay Gajjala, Sammamish, WA (US); Timothy Gill, Kenmore, WA (US); James T. Jacoby, Sammamish, WA (US); Stephane Plante, Kirkland, WA (US); Craig A. Gick, Woodinville, WA (US); Richard K. Costleigh, Seattle, WA (US); Luke Jared Lenhart, Woodinville, WA (US); Ajay S. Kang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 230 days.

(21) Appl. No.: 13/779,413

(22) Filed: Feb. 27, 2013

(65) Prior Publication Data

US 2014/0245373 A1 Aug. 28, 2014

(51) Int. Cl.
*G06F 11/00* (2006.01)
*G06F 21/62* (2013.01)
(Continued)

(52) U.S. Cl.
CPC ........ *G06F 21/6218* (2013.01); *G06F 21/335* (2013.01); *G06F 21/604* (2013.01);
(Continued)

(58) Field of Classification Search
CPC ................. G06F 21/604; G06F 2221/2141
See application file for complete search history.

(56) References Cited

U.S. PATENT DOCUMENTS 7,213,262 B1 * 5/2007 Elley .................. G06F 21/6218
709/229
7,219,234 B1 * 5/2007 Ashland ............... G06F 21/604
709/216

(Continued)

OTHER PUBLICATIONS

"International Search Report & Written Opinion for PCT Application No. PCT/US2014/017877", Mailed Date: Apr. 28, 2014, Filed Date: Feb. 24, 2014, 9 Pages.

(Continued)

*Primary Examiner* — Mohammed Waliullah
(74) *Attorney, Agent, or Firm* — Aaron Chatterjee; Dan Choi; Micky Minhas

(57) ABSTRACT

Embodiments are disclosed for managing and providing access to a collection of digital resources. One embodiment provides a method comprising receiving a request to access a resource for a principal and determining one or more principal groups to which the principal belongs. The method further comprises obtaining resource set membership information indicating a resource set to which the resource belongs, and obtaining resource set access policy information for the resource set to which the resource belongs. The method yet further comprises determining whether the principal is allowed to access the resource based on the principal group membership information and the resource set access policy information, and, if the principal is allowed to access the resource, then permitting access to the resource by the principal.

16 Claims, 5 Drawing Sheets

(51) Int. Cl.
*G06F 21/60* (2013.01)
*G06F 21/33* (2013.01)
*H04W 4/08* (2009.01)
*H04W 4/18* (2009.01)
*H04L 29/06* (2006.01)

(52) U.S. Cl.
CPC ............ *H04L 63/104* (2013.01); *H04L 63/20* (2013.01); *H04W 4/08* (2013.01); *H04W 4/18* (2013.01); *G06F 2221/2141* (2013.01); *H04L 63/101* (2013.01)

(56) References Cited

U.S. PATENT DOCUMENTS

| | | | | |
|---|---|---|---|---|
| 7,606,916 | B1* | 10/2009 | Potter ..................... | G06F 9/505 709/227 |
| 7,685,206 | B1 | 3/2010 | Mathew et al. | |
| 8,650,617 | B2* | 2/2014 | Gleichauf ........... | H04L 63/0807 709/217 |
| 2004/0162906 | A1 | 8/2004 | Griffin et al. | |
| 2007/0150480 | A1* | 6/2007 | Hwang ................ | G06Q 10/00 |
| 2008/0104705 | A1* | 5/2008 | Hasbun ................ | G06F 21/105 726/26 |
| 2008/0256607 | A1 | 10/2008 | Janedittakarn et al. | |
| 2009/0228967 | A1 | 9/2009 | Gbadegesin et al. | |
| 2010/0049968 | A1 | 2/2010 | Dimitrakos et al. | |
| 2010/0081417 | A1* | 4/2010 | Hickie ................. | G06F 21/604 455/414.1 |
| 2010/0319004 | A1 | 12/2010 | Hudson et al. | |
| 2011/0010758 | A1 | 1/2011 | Faitelson et al. | |
| 2011/0154465 | A1* | 6/2011 | Kuzin et al. ..................... | 726/9 |
| 2012/0167167 | A1 | 6/2012 | Kruger et al. | |

OTHER PUBLICATIONS

Almutairi, et al., "A Distributed Access Control Architecture for Cloud Computing", Retrieved at <<http://ieeexplore.ieee.org/stamp/stamp.jsp?tp=&arnumber=6095492>>, In the Proceeding of IEEE Software vol. 29, No. 2, Mar.-Apr. 2012, pp. 4.

"Enhanced Secure Multi-Tenancy Design Guide", Retrieved at <<http://www.cisco.com/en/US/docs/solutions/Enterprise/Data_Center/Virtualization/securecIdg_V2.pdf>>, Oct. 8, 2010, pp. 139.

European Patent Office, Written Opinion of the International Preliminary Examining Authority of PCT/US2014/017877, WIPO, 6 pages.

IPEA European Patent Office, International Preliminary Report on Patentability Issued in Application No. PCT/US2014/017877, May 20, 2015, WIPO, 7 Pages.

* cited by examiner

DISCRETIONARY POLICY MANAGEMENT IN CLOUD-BASED ENVIRONMENT

BACKGROUND

Access to a collection of digital resources is often managed by individually defining access policies for each resource and for each authorized party. As user authorizations to access content change over time, such discretionary policy for each affected party may require updating to maintain desired security settings. In some scenarios, such as where a content service is accessed by multiple individuals from each of a number of potentially unrelated entities on a potentially massive scale, maintenance of such security settings may be complex and potentially prone to error.

SUMMARY

Embodiments are disclosed for managing access to content. One disclosed embodiment provides a method comprising receiving a request to access a resource for a principal. The method further comprises determining one or more principal groups to which the principal belongs, obtaining resource set membership information indicating a resource set to which the resource belongs, and obtaining resource set access policy information for the resource set to which the resource belongs. The method further comprises determining whether the principal is allowed to access the resource based on the principal group membership information and the resource set access policy information, and, if the principal is allowed to access the resource, then permitting access to the resource by the principal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
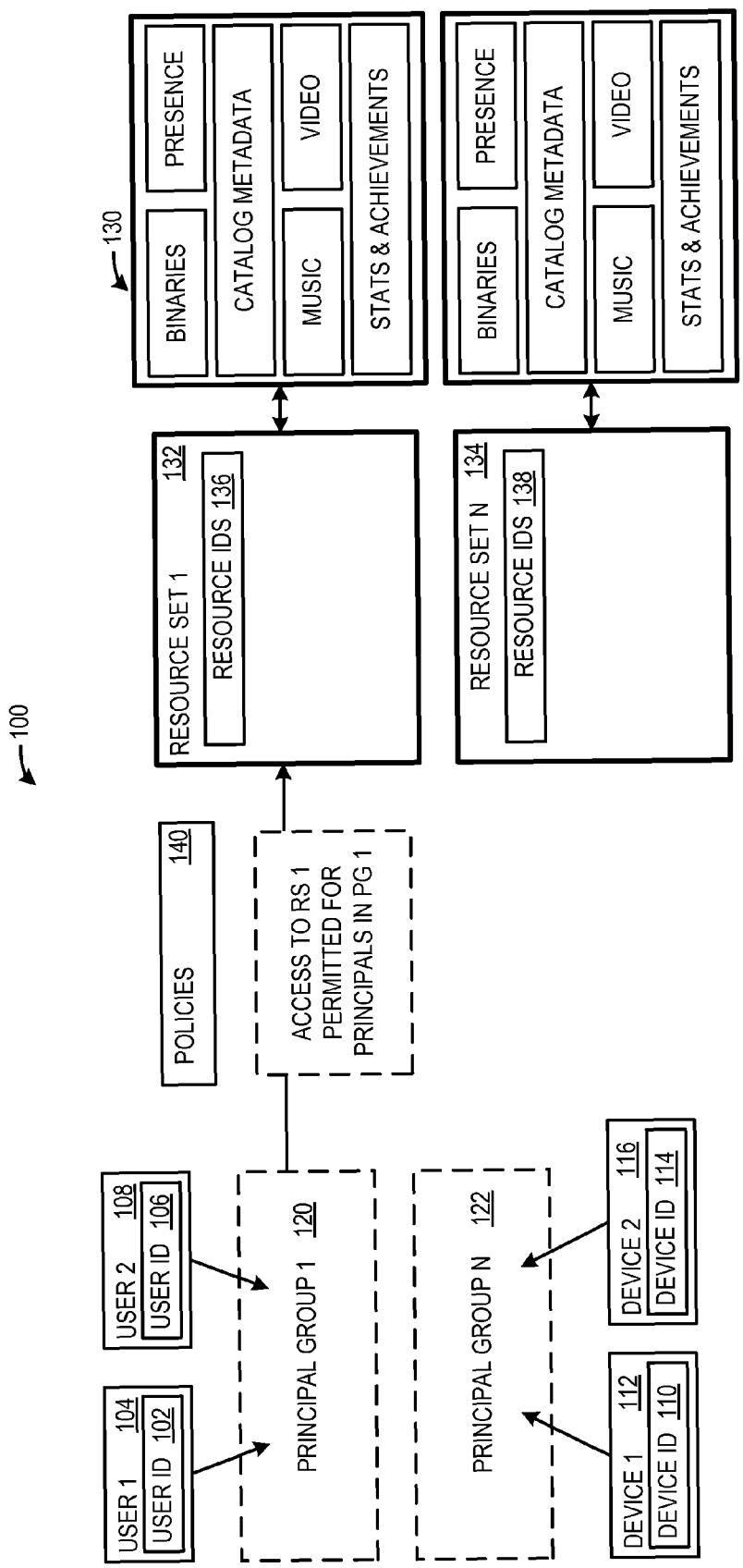
FIG. 1 shows a schematic diagram illustrating an example system for managing discretionary content access policies according to an embodiment of the present disclosure.

As mentioned above, managing access to content on a per-user and per-item basis may be difficult on a large scale. For example, a cloud-based content service (e.g., online game service, software development service, etc.) may be used by a potentially massive quantity of people from each of a potentially massive quantity of entities to access a potentially massive quantity of resources. In such a system, effectively managing access policies on an individual basis may be time-consuming, inefficient, and prone to error.

As one non-limiting example, a video game development service may provide developers with cloud-based storage for resources under development and/or beta testing, and also provide access to stored resources. In such a system, resource access policies for an item under development may be used to control access to resources for each a plurality of interested parties, including but not limited to developers, program managers, other key employees, third-party partners, vendors, and the like. Where an entity has multiple items under development, such policies are managed for each of the multiple items. The policies may define, for example, which users, which computing devices, which client applications, etc. may be utilized to access the game development content. The term access may refer to any suitable type of access, including but not limited to actions such as create, read, update, and delete.

In such an environment, if policies are managed on an individual user/individual resource basis, any changes in authorization (e.g., lost device, development team changes, new content, etc.) may necessitate modifying individual permissions for each affected party. Given that a development effort may involve a relatively large and variable number of users and resources having a range of access authorizations, maintaining permissions on an individual basis for such resources and users in a cloud-based development environment may be difficult, time consuming, and subject to error. Policies can also apply to business partners (where the term "business partners" may signify grouping of web sites together), such that a policy system may provide access to one or more websites, while also deny access to others. Policies also may be configured to span multiple titles.

Further, in such an environment, multiple services may have the ability to access content from a particular content store. For example, an example online game development service may comprise a plurality of discrete services (e.g., achievement service, multiplayer session service, image service, etc.) that may each access stored resources. As such, each service may include service-specific access policies. In this case, updates to resource access policies may involve updating the policies individually for each of such services. Likewise, failure to effect such changes may impact security and/or the user experience of the developers.

Accordingly, embodiments are disclosed that relate to efficiently managing resource access policies in a cloud-based environment (e.g. an environment in which resources and/or access policies are stored in a multi-tenant network-accessible location) by grouping users and resources into respective groups to which policies are applied. A service, when determining whether to permit access to content accessed by the service, may obtain information regarding the group memberships of the content and the user requesting the content, and may also obtain access policy information. Such group memberships and policies may be more efficiently maintained and updated as compared to typical approaches where access policies for individual users and individual resources are managed for each service of a plurality of services that access the content.

Prior to discussing these embodiments in more detail, reference is made to FIG. 1, which shows a block diagram 100 depicting an example scenario for authorizing access of a principal to content. The term "principal," as used herein, may refer to any unique identifier that can be reliably and securely utilized as proof of identity. Examples of principals include, but are not limited to, a user identification number, a service identification number, a device identification number, and a title identification from a running title on a client platform. FIG. 1 shows a first principal 102 in the form of a user identified by a first user id 104, a second principal 106 in the form of a user identified by a second user id 108, a third principal as a device 110 having a first device id 112, and a fourth principal as a device 114 having a second device id 116.

In some example embodiments, a principal may establish proof of identity with a token issuer. In other embodiments, the principals may not be verified, validated, etc. Instead, the principal may be encrypted via a private/public key pair. As the public key may be readily known, such a configuration may enable the generation of spoofed principals, thereby potentially reducing overall security. However, as a pool of potential principals may be large in some embodiments (for example, where a principal is identified via 4096 random bytes), such manual generation of a valid principal may be suitably unlikely. It will be appreciated that these examples of methods of establishing an identity of a principal are presented for the purpose of example, and are not intended to be limiting in any manner.

FIG. 1 further illustrates the principals as organized into an arbitrary number N of principal groups (PGs) 120 and 122. As described in more detail below, policy related to principals may be managed by a PG as a smallest unit. A PG may correspond, for example, to software developers (as shown via PG 120), beta test users, registered development kits (as shown via PG 122), and/or any other suitable entity or type of entity. Although each of the illustrated principals is shown as mapping to a single PG 120 or 122, it will be appreciated that a particular principal may map to plural PGs without departing from the scope of the present disclosure. Further, in some embodiments, users and devices may not map to a same PG, while in other embodiments such principals may map to a same PG. It will be understood that any suitable number of PGs may be used to manage policy in any suitable manner.

FIG. 1 also illustrates resources 130 organized into resource sets (RSs) 132 and 134. Each RS 132 and 134 comprises one or more resource identities, shown respectively at 136 and 138, that signify which resources are members of the respective library. Examples of resources 130 include, but are not limited to, downloadable video game binaries, offer metadata (e.g., advertisements, etc.), in-game statistics/achievements (e.g., roaming user profile), soundtrack music, videos, multiplayer session templates, and the like. In some embodiments, each resource may comprise any suitable type of content that is identifiable by a sufficiently unique identification. It will be understood that a resource may be included in multiple RSs in some instances.

Resources in a selected RS may be accessed by a single corresponding service, or by a plurality of services. Further, resources in a RS may be stored in a same location or different locations. In the example of FIG. 1, the RSs are illustrated as development RS 132 and beta RS 134, but it will be understood that RSs may be defined in any other suitable manner.

As a potentially large number of resources may be used in the development of digital content, the management of resources by group, rather than by individual resource, may simplify the setting and maintenance of policies for those resources. Likewise, managing policy for principals based upon PG membership also may simplify setting and maintenance of policies for organizations in which a large number of individuals may use content, work on different development projects, or perform other tasks, and where permissions may change over time.

FIG. 1 further illustrates policies 140 in the form of rules that specify which PGs may perform what actions with regard to which RSs. Examples of actions specified by policies may include, but are not limited to, read, write, delete, update, manage, etc. The term "write" may be used herein to signify any action in which policy is created or changed, including, but not limited to, creating, updating and deleting.

The policies may specify any suitable conditions for accessing resources. For example, in the example of FIG. 1, one example policy is illustrated, wherein the policy specifies that members of PG 120 can access resources in RS 1 132. Further, in some scenarios, membership in more than one PG may be a condition for accessing content in a RS. It will be understood that these policies are presented for the purpose of example, and that any suitable type of policies, as well as any suitable number of policies, may be used.

Policies 140 may be accessed by one or more services used to access content for principals. The services may then utilize information regarding the PG membership of the principal and RS membership of a resource to determine whether to grant the principal access to the resource in light of any one or more corresponding policies. In this manner, policy may be centrally managed for a plurality of services, rather than at each possible service that may use the policy, so as to allow policy rules to be conveniently tracked and updated. Further, as described below, policies may be stored in a distributed manner in some instances (e.g. via caches local to service(s) that utilize the policies) for efficiency and resilience. It will be understood that a policy rule may be configured to apply specifically to one or more selected services and/or RSs, while other policy rule(s) may be applied globally across services and/or libraries.

Figure 2:
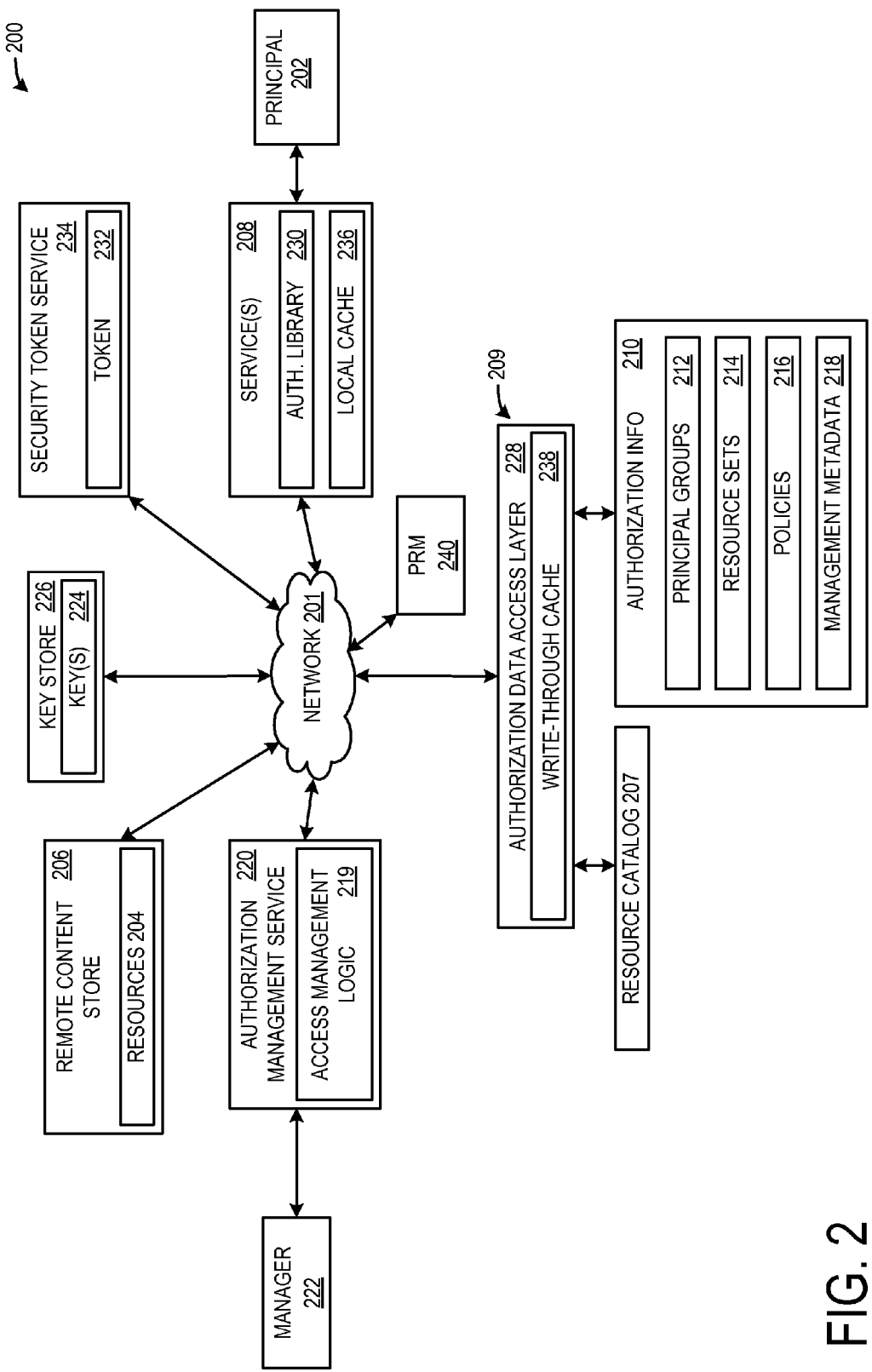
FIG. 2 schematically shows an example use environment for a system for surfacing content according to an embodiment of the present disclosure.

Turning to FIG. 2, an example system 200 for providing a principal 202 access to resources is shown. Example resources are illustrated as resources 204 located in a remote content store 206 (e.g. a developer-specific content store) and a resource catalog 207 comprising resources accessible via a remote cloud-based access management service 209 usable to store access management information, as described in more detail below. It will be understood that resources may be stored in any suitable location, and that different resources in a RS may be stored in different locations. It will further be understood that the depicted configuration is provided for the purpose of illustration, and is not intended to be limiting in any manner.

FIG. 2 also illustrates an authorization data store 210 as storing authorization information regarding PGs 212, RSs 214, policies 216 regarding the access of RSs 214, and/or other management metadata 218 in cloud-based storage. As such, system 200 may decouple the provision of resources 204 from the provision and enforcement of access policies regarding the content. Authorization information may be managed via access management logic 219 of an authorization management service 220. More specifically, each PG 212 and RS 214 has an "owner" or manager with the ability to manage owned groups, libraries, and associated policy. FIG. 2 shows a single manager 222 for the purpose of example, but it will be understood that system 200 may be used by many managers to separately manage policies regarding many resources and PGs, with each manager 222 being able to create and manage PGs, RSs, and corresponding policies via authorization management service 220. In some embodiments, authorization management service 220 may be implemented on one or more protected computing devices (e.g., services) capable of maintaining high business impact ("HBI") information.

In order to create and manage PGs 212, RSs 214, and policies 216, manager 222 may have access, via authorization management service 220, to one or more keys 224 (e.g., policy signing key, write key, etc.) stored at a key store 226. Keys 224 may be presented to, or otherwise utilized to interact with, an authorization data access layer 228 associated with authorization data store 210, thereby enabling the authorization management service to access (e.g. write) information within data store. In other embodiments, authorization of manager(s) 222 to access data store 210 may be provided by additional and/or different mechanism(s) without departing from the scope of the present disclosure.

Utilizing system 200, content may be provided to a principal 202 as follows. To access content, a principal may log into service(s) 208 by providing suitable identification information. In some embodiments, upon receipt of the information, authorization library 230 of service 208 may be configured to contact a security token service 234 via network 201 to retrieve a signed security token 232 for the principal, thereby authenticating principal 202 to service 208. In other embodiments, the security token may be provided by the principal without interacting with a remote security token service. In yet other embodiments, any other suitable authentication process may be used, including authentication process(es) that do not utilize tokens.

Where used, the security token service 234 may be configured to retrieve information from data store 210 regarding PGs 212 associated with the requesting principal 202. The PG membership information for the principal may then be appended to, or otherwise provided with, security token 232. In some embodiments, upon receipt of the PG information, service 208 may be configured to cache at least some of the information via local cache 236 for a suitable duration (e.g. for the duration of a login session). This may help to avoid accessing data store 210 for each access policy determination during that use session, and therefore may allow access determinations to be made more efficiently than without the use of a local cache. It will be appreciated that this configuration is presented for the purpose of example, and other embodiments may utilize any suitable caching mechanism(s), or even no caching mechanism, without departing from the scope of the present disclosure.

Authorization library 230 also may be configured to implement resource access decision(s) at content access runtime. For example, upon authorizing principal(s) 202 (e.g., via security token service 234, or in any other suitable manner), service(s) 208 may receive one or more requests for resources 204 from a client device associated with principal 202, and may, in response, locate the content. Authorization library 230 then may obtain RS membership information regarding a RS 214 to which the requested resource(s) belong. Upon determination of the appropriate RS 214, authorization library 230 may be further configured to obtain, via authorization data access layer 228, RS access policy information for the RS to which the resource belongs. The authorization library 230 may then use such policy information to determine whether the requesting principal can access the requested content based upon the PG membership of principal 202 and the RS group membership of the requested content.

In some embodiments, information that is accessed via authorization data access layer 228 may be cached via a write-through cache 238, again to allow potentially faster future access of the cached data, as well as to provide resiliency, whereas such caching may not be provided and/or may be provided via other mechanism(s) in other embodiments. Cache 238 may serve as a cloud-based cache that is available to all services in the system 200. Cache 238 may be located on a different machine than the services that access it (e.g. services 208), yet provide low latency from being local to authorization information 210. In some embodiments, cache 238 may provide for caching of data across two or more machines; for example, if two machines are acting as "service x" and one of the machines looks something up via authorization data access layer 228, then when the second machine does the same lookup, the information may be stored in cache 238.

In some embodiments, the data for system 200 may be stored in a distributed manner. In such embodiments, system 200 may further include a partition resource manager ("PRM") 240 configured to understand location(s) at which various may be accessed. The use of the PRM 240 may help to ensure robustness of the system 200. It will be understood that other embodiments may not utilize a PRM.

As mentioned above, some RSs 214 and/or resources thereof may be maintained and accessed by individual service(s) 208. Thus, such resources may be stored in location(s) (e.g. remote content store 206) other than authorization information data store 210. Likewise, resources that are shared between services may be stored within authorization information data store 210. This may help to reduce the amount of data stored on authorization information data store 210, and therefore may help to reduce the utilization of access management service 209. This may provide performance advantages in light of the loads that may be handled by a large consumer facing service. Thus, system 200 may help to facilitate the efficient management and application of resource access policy in a cloud-based environment.

Furthermore, due to the distributed nature of system 200, the cloud-based store(s) storing such information (e.g., data store 210) need not be hosted in environments that are able sustain requirements for HBI information, as such higher security is selectively provided by other entities of system 200 (e.g., authorization management service 220, key store 226, and/or security token service 234).

Additionally, by providing cloud-based storage of PG 212 membership, RS 214 definitions, and policies 216, increased resilience of information may be realized. For example, by caching at least some of such information via cache 238 of data store 210 and/or via cache 236 of any one or more services 208, it will be appreciated that the information may be more readily and reliably available as compared to typical approaches. Thus, if one or more entities, such as data store 210, become inaccessible via network 201 (e.g., due to schedule maintenance, hardware and/or software problems, etc.) information usable to ensure the integrity of system 200 may remain available via one or more caching mechanisms.

Figure 3:
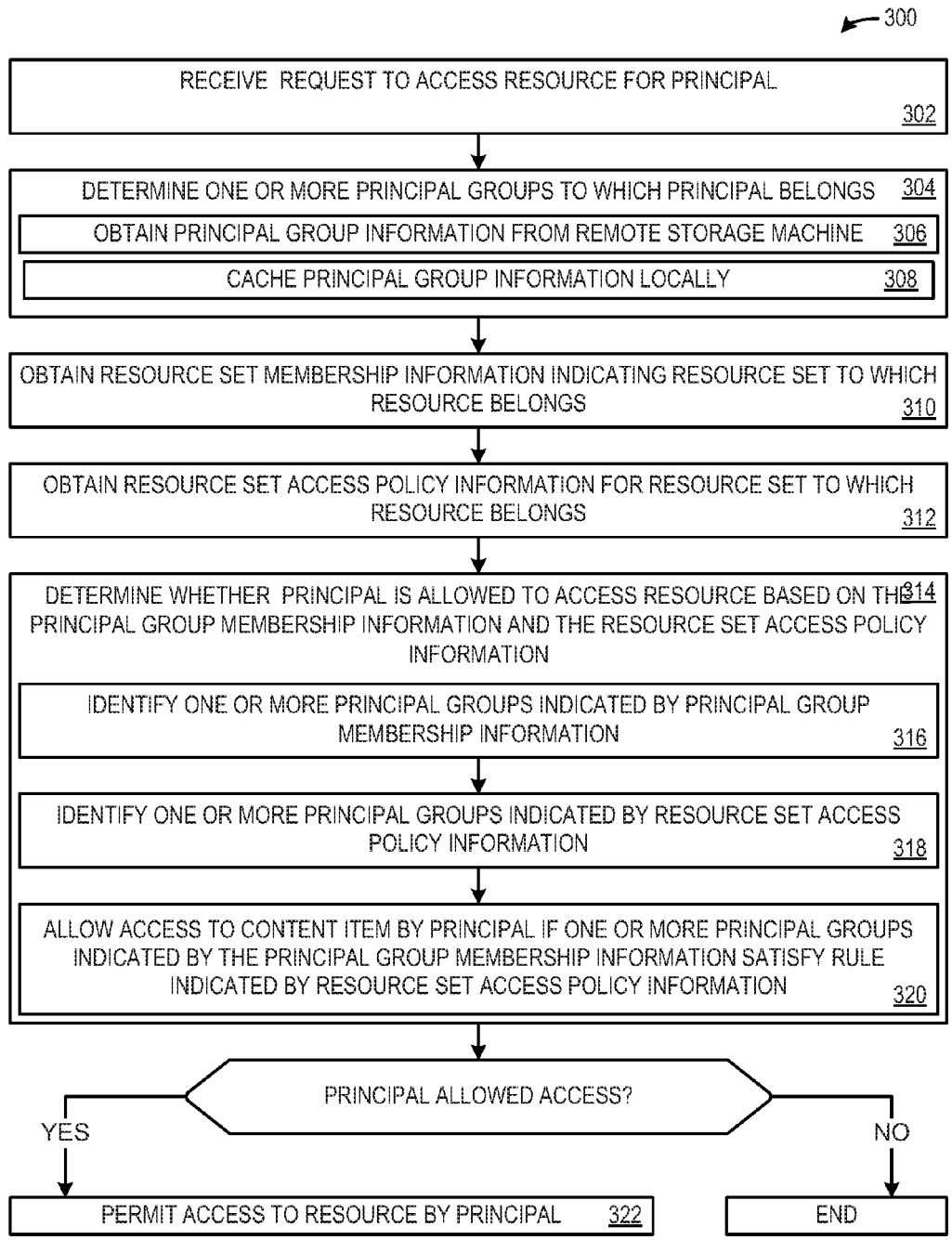
FIG. 3 shows an example method for authorizing access to content according to an embodiment of the present disclosure.

FIG. 3 shows a flow diagram depicting an embodiment of a method 300 for controlling access to a resource. Method 300 may be implemented via a computing device (for example, a computing device providing a service(s) 208) configured to access content in response to a request received from a client device associated with a principal (e.g., principal 202). Before continuing with description of method 300, it will be appreciated that any one or more operations provided by method 300 may be performed in parallel and/or in a different order in some embodiments.

Furthermore, at least some of the disclosed operations may be provided by a single operation, and/or a single disclosed operation may be provided by multiple operations in various embodiments.

At 302, method 300 comprises receiving a request for access a resource for a principal. The request may be received from a client device, or from an entity other than a client (e.g., one or more relaying services) and/or may include a request for a RS, as opposed to a request for a single resource. It will be appreciated that these scenarios are presented for the purpose of example, and are not intended to be limiting in any manner. As mentioned above, the resource may include any suitable type of resource, including but not limited to content.

At 304, method 300 further comprises determining one or more PGs to which the principal belongs. As described above, access authorization is determined for a principal by membership of the principal in any one or more PGs. Thus, in some embodiments, determining 304 the PGs may include obtaining 306 PG information from a remote storage machine. As a more specific example, in some embodiments, the PG information may be appended to, or otherwise provided with, a security token received from a security token service, wherein the security token service retrieves the PG information from a remote storage machine. In other embodiments, the PG information may be obtained or provided in any other suitable manner.

Method 300 may further comprise, at 308, caching the PG information locally (e.g., via local cache 236) in some embodiments. As mentioned above, repeatedly obtaining PG membership information from remote storage as a principal requests content during a use session may be inefficient in some situations. For example, the remote storage from which such information is obtained may experience reduced throughput as compared to other computing device(s), service(s), etc. Accordingly, such caching may reduce the frequency at which such remote storage is accessed.

At 310, method 300 further comprises obtaining RS membership information indicating a RS to which the resource belongs. For example, the request received from the client device may specify the requested resource by a unique content identifier (e.g., resource identity 136, 138), and this unique identifier may be utilized to access the RS membership information for the requested resource. For example, in some embodiments, such membership information may be retrieved from data store(s) storing PG information and/or from other data stores. In some situations, such as where the entity requesting the information knows the resource set being accessed, this step may be omitted.

Method 300 further comprises obtaining 312 RS access policy information for the RS and/or the PG to which the resource and/or principal respectively belongs. As mentioned above, RSs and PGs may represent the smallest unit on which access can be controlled for the resources and principals respectively, and thus the access policy information may determine what group membership(s) are required in order to gain access to the resource.

Upon obtaining the PG, RS, and policy information, method 300 further comprises determining 314 whether the principal is allowed to access the resource based on the PG membership information and the RS access policy information (e.g., via one or more comparison mechanisms). Such determination may include, for example, identifying 316 one or more PGs indicated by the PG membership information, and identifying 318 one or more PGs indicated by the RS access policy information. Using this information, method 300 may comprise, at 320, allowing the principal to access the resource if the one or more PGs indicated by the PG membership information satisfy a rule indicated by the RS access policy information regarding the one or more PGs. In other words, if the principal belongs to the one or more PGs required for access to the resource, then access to the resource by the principal, based upon inclusion of the resource in the associated RS, may be permitted at 322. On the other hand, if the principal is determined to not belong to the one or more PGs identified by the RS access policy information, then access is denied.

Instead of, or in addition to, caching 308 of PG information, method 300 may further include utilization of various caching mechanisms (not illustrated) in some embodiments. For example, the various information utilized to determine whether access is to be allowed may be acquired via one or more local and/or remote caching mechanisms, if available. In this way, the information may be preferentially acquired via the caching mechanism(s) when possible, and may only be obtained via other mechanism(s) or service(s) if the information is not presently cached. In yet other embodiments, all of such information may be cached via one or more mechanism(s) upon commencement of method 300. Although such a configuration may experience increased initialization time over other configurations, such caching may still provide improved performance as the information has a higher probability of being available via low-latency (i.e., caching) mechanism(s).

Figure 4:
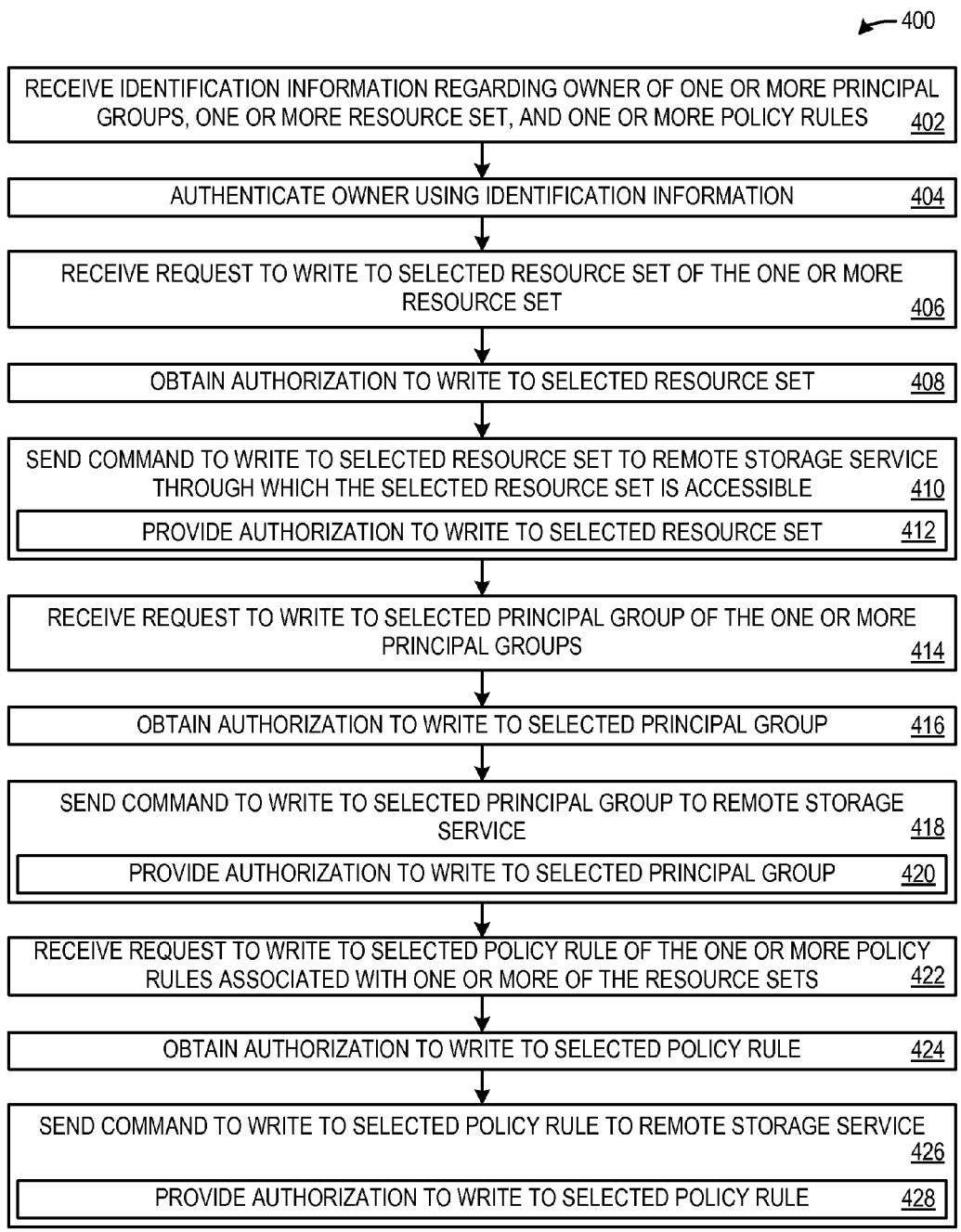
FIG. 4 shows an example method for managing security policy for a collection of digital resources according to an embodiment of the present disclosure.

As mentioned above with regard to FIG. 2, PGs, libraries and policies each may be managed by owners/managers via an authorization management service. FIG. 4 shows a flow diagram depicting an embodiment of a method 400 for managing security policy for a collection of digital resources with respect to a collection of principals.

Method 400 comprises, at 402, receiving identification information regarding an owner of one or more PGs, one or more RSs, and one or more policy rules; and may further comprise authenticating 404 the owner using the identification information. Such information may be received, for example, during a login process at the authorization management service. As described above, the policy rules define access authorization for RSs by PGs, with each PG comprising one or more principals and each RS comprising one or more digital resources. The authentication of a manager as an owner may be performed in any suitable manner. As one non-limiting example, the identification information may include a user id and/or other identification usable to uniquely identify the manager. The unique identification information may be provided to a remote security token service (e.g., security token service 234) and one or more security tokens validating the identity of the manager may be returned in response.

The manager may be able, as owner, to modify and/or create any one or more PGs, RSs, and/or policy rules owned by that manager. Thus, at 406, method 400 comprises receiving a request to write to a selected RS of the one or more RSs (e.g. by creating or modifying the selected RS). At 408, method 400 further comprises obtaining authorization to write to the selected RS. As mentioned above, the storage machine(s) (e.g., data store 210) storing information regarding the PGs, RSs, and/or policy rules may utilize one or more keys to determine whether to permit authorization to modify the stored information. Thus, obtaining authorization may comprise obtaining an appropriate key or keys in some embodiments.

Once proper authorization to write to the selected RS has been obtained, method 400 may further comprise sending, at 410, a command to write to the selected RS to a remote storage service through which the selected RS is accessible. In some embodiments, sending of such a command may include providing 412 to the remote storage service the authorization (e.g., via one or more keys or other suitable mechanism) to write to the selected RS with the command. In other embodiments, such authorization may be provided separate from the command and/or may be provided via other mechanism(s) without departing from the scope of the present disclosure.

Whereas RSs may represent the smallest unit of content on which access can be controlled, PGs may represent the smallest unit used to make access decisions for principals. Thus, method 400 further comprises receiving, at 414, a request to write to (e.g. create, modify, delete) a selected PG, and obtaining, at 416, authorization to write to the selected PG. It will be appreciated that such authorization may be obtained via similar mechanism(s) as authorization to write to the selected RS, such as by acquiring one or more keys. Once authorization has been acquired, method 400 further comprises, at 418, sending a command to write to the selected PG to the remote storage service. Sending 418 may include, providing, at 420, to the remote storage service the authorization (e.g., one or more keys) to write to the selected PG. It will be appreciated that these scenarios are presented for the purpose of example, and are not intended to be limiting in any manner.

As mentioned above, the owner also may have ownership of one or more access authorization policies related to PGs and RSs also managed by that owner. Thus, method 400 may further comprise receiving, at 422, a request to write to a selected policy rule (e.g. by creating a new rule or modifying an existing rule) of the one or more policy rules associated with one or more of the RSs, and obtaining, at 424, authorization to write to the selected policy rule. Method 400 may further comprise sending, at 426, a command to write to the selected policy rule to the remote storage service, which may include, for example, providing 428 to the remote storage service the authorization to write to the selected policy rule.

In some embodiments, the described collection of digital resources may be accessed by a plurality of relaying services (e.g., services 208). Accordingly, in some embodiments, some policy rules may be global policy rules that apply to each of the plurality of content services, while other policy rules may be service-specific policy rules that apply to a subset of one or more services. In a cloud-based environment, it will be appreciated that method 400 may be performed by each of a plurality of management services, and such management may be provided for a plurality of managers and/or principals, each of whom may be authorized to access and/or modify different digital resources stored via a cloud-based service.

The disclosed embodiments may provide various advantages compared to other methods and systems for managing policy, which may be challenging to use on a massive scale in a cloud-based environment. For example, the disclosed embodiments may allow granular control of access to content accessed by cloud-based services such that a content provider hosting content on a cloud-based service may be able to granularly decide which users and/or devices can access the content on the services through the use of PGs and RSs. Likewise, the disclosed embodiments also may facilitate self management in a multi-tenancy storage environment by third party content owners of the access policies applying to the content, without risk of discovering or tampering with policies of others. Further, the distributed nature of the policy storage and enforcement may allow efficient authorization decision(s) at content access runtime under the loads of a large consumer facing service. Additionally, the policies stored are securely distributed, which may help to prevent tampering with policies at any point in the overall system. It will be appreciated that policies may be applied to any type of content, as long as the content can be uniquely identified.

In some embodiments, the methods and processes described above may be tied to a computing system of one or more computing devices. In particular, such methods and processes may be implemented as a computer-application program or service, an application-programming interface (API), a library, and/or other computer-program product.

Figure 5:
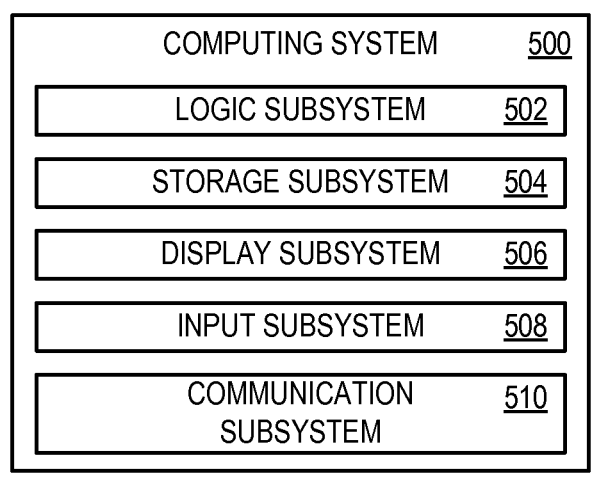
FIG. 5 schematically shows an example embodiment of a computing device according to an embodiment of the present disclosure.

FIG. 5 schematically shows a non-limiting embodiment of a computing system 500 that can enact one or more of the methods and processes described above. It will be understood that virtually any computer architecture may be used without departing from the scope of this disclosure. In different embodiments, computing system 500 may take the form of a mainframe computer, server computer, desktop computer, laptop computer, tablet computer, home-entertainment computer, network computing device, gaming device, mobile computing device, mobile communication device (e.g., smart phone), etc.

Computing system 500 includes a logic subsystem 502 and a storage subsystem 504. Computing system 500 may optionally include a display subsystem 506, input subsystem 508, communication subsystem 510, and/or other components not shown in FIG. 5.

Logic subsystem 502 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 504 includes one or more physical, non-transitory, devices configured to hold data and/or instructions executable by the logic subsystem to implement the methods and processes described herein. When such methods and processes are implemented, the state of storage subsystem 504 may be transformed—e.g., to hold different data.

Storage subsystem 504 may include removable media and/or built-in devices. Storage subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 504 may include volatile, nonvolatile, dynamic, static, read/write, read-only, random-access, sequential-access, location-addressable, file-addressable, and/or content-addressable devices.

It will be appreciated that storage subsystem 504 includes one or more physical storage devices. However, in some embodiments, aspects of the instructions described herein may be propagated by a pure signal (e.g., an electromagnetic signal, an optical signal, etc.) via a transmission medium, as opposed to a storage device. Furthermore, data and/or other forms of information pertaining to the present disclosure may be propagated by a pure signal.

In some embodiments, aspects of logic subsystem 502 and of storage subsystem 504 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

It will be appreciated that a "service", as used herein, may comprise an application program executable across multiple user sessions. A service may be available to one or more system components, programs, and/or other services. In some implementations, a service may run on one or more server-computing devices.

When included, display subsystem 506 may be used to present a visual representation of data held by storage subsystem 504. This visual representation may take the form of a graphical user interface (GUI). As the herein described methods and processes change the data held by the storage subsystem, and thus transform the state of the storage subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method for managing security policy for a collection of digital resources with respect to a collection of principals, the method comprising:
   receiving, via a processor of the computing device, identification information regarding an owner of one or more principal groups, one or more resource sets, and one or more policy rules, the policy rules regarding access to the resource sets by the principal groups, each principal group comprising one or more principals and each resource set comprising one or more digital resources;
   authenticating, via a security token service, the owner using the identification information, the security token service being located remotely from the computing device;
   receiving, via the processor of the computing device, a request to write to a selected resource set of the one or more resource sets;
   obtaining, via the authorization data information store, authorization to write to the selected resource set, the authorization data information store having a lower security level than the security token service;
   sending, via the processor of the computing device, a command to write to the selected resource set to a remote storage service through which the selected resource set is accessible and providing to the remote storage service the authorization to write to the selected resource set with the command;
   receiving, via the processor of the computing device, a request to write to a selected policy rule of the one or more policy rules associated with one or more of the resource sets;
   obtaining, via the processor of the computing device, authorization to write to the selected policy rule; and
   sending, via the processor of the computing device, a command to write to the selected policy rule to the remote storage service and providing to the remote storage service the authorization to write to the selected policy rule.

2. The method of claim 1, where obtaining authorization to write to one or more of the selected resource set, a selected principal group, and a selected policy rule comprises obtaining, via the processor of the computing device, one or more keys from a remote key store.

3. The method of claim 1, wherein the remote storage service comprises the authorization data information store.

4. The method of claim 1, where the selected policy rule comprises a global policy rule that applies to each of a plurality of content services.

5. The method of claim 4, where the selected policy rule is a service-specific policy rule that applies to one content service of the plurality of content services.

6. The method of claim 1, further comprising:
receiving, via the processor of the computing device, a request to write to a selected principal group of the one or more principal groups;
obtaining, via the processor of the computing device, authorization to write to the selected principal group; and
sending, via the processor of the computing device, a command to write to the selected principal group to the remote storage service and providing to the remote storage service the authorization to write to the selected principal group.

7. The method of claim 6, wherein the request to write to the selected principal group comprises one or more of a request to create a new principal group and a request to modify an existing principal group.

8. The method of claim 1, wherein the owner is a first owner, and further comprising receiving, via the processor of the computing device, second identification information regarding a second owner;
authenticating, via the processor of the computing device, the second owner using the second identification information;
receiving, via the processor of the computing device, a request to write to a second selected resource set of the one or more resource sets owned by the second owner;
obtaining, via the processor of the computing device, authorization to write to the second selected resource set; and
sending, via the processor of the computing device, a command to write to the second selected resource set to the remote storage service through which the selected resource set is accessible.

9. A computing device, comprising:
a logic subsystem configured to execute computer-readable instructions, the logic subsystem comprising a processor; and
a storage subsystem storing instructions that are executable by the logic subsystem to:
receive, via a processor of the computing device, identification information regarding an owner of one or more principal groups, one or more resource sets, and one or more policy rules, the policy rules regarding access to the resource sets by the principal groups, each principal group comprising one or more principals and each resource set comprising one or more digital resources;
authenticate, via a security token service, the owner using the identification information, the security token service being located remotely from the computing device;
receive, via the processor of the computing device, a request to write to a selected resource set of the one or more resource sets;
obtain, via the authorization data information store, authorization to write to the selected resource set, the authorization data information store having a lower security level than the security token service;
send, via the processor of the computing device, a command to write to the selected resource set to a remote storage service through which the selected resource set is accessible and providing to the remote storage service the authorization to write to the selected resource set with the command;
receive, via the processor of the computing device, a request to write to a selected policy rule of the one or more policy rules associated with one or more of the resource sets;
obtain, via the processor of the computing device, authorization to write to the selected policy rule; and
send, via the processor of the computing device, a command to write to the selected policy rule to the remote storage service and providing to the remote storage service the authorization to write to the selected policy rule.

10. The computing device of claim 9, wherein the instructions are further executable to:
obtain, via the processor of the computing device, an authorization to write to one or more of the selected resource set, a selected principal group, and a selected policy rule; and
obtain, via the processor of the computing device, one or more keys from a remote key store.

11. The computing device of claim 9, wherein the instructions are further executable to:
receive, via the processor of the computing device, a request to write to a selected principal group of the one or more principal groups;
obtain, via the processor of the computing device, authorization to write to the selected principal group; and
send, via the processor of the computing device, a command to write to the selected principal group to the remote storage service and providing to the remote storage service the authorization to write to the selected principal group.

12. The computing device of claim 9, wherein the owner is a first owner, and the instructions are further executable to:
obtain, via the processor of the computing device, second identification information regarding a second owner;
authenticate, via the processor of the computing device, the second owner using the second identification information;
receive, via the processor of the computing device, a request to write to a second selected resource set of the one or more resource sets owned by the second owner;
obtain, via the processor of the computing device, authorization to write to the second selected resource set; and
send, via the processor of the computing device, a command to write to the second selected resource set to the remote storage service through which the selected resource set is accessible.

13. The computing device of claim 9, wherein the selected policy rule comprises a global policy rule that applies to each of a plurality of content services.

14. The computing device of claim 9, wherein the selected policy rule comprises a service-specific policy rule that applies to one content service of the plurality of content services.

15. The computing device of claim 11, wherein the instructions executable to receive the request to write to the selected policy group comprises instructions executable to receive one or more of a request to create a new principal group and a request to modify an existing principal group.

16. The computing device of claim 9, wherein the remote storage service comprises the authorization data information store.

* * * * *